March 1, 1960

G. SENSENEY 2,927,257

NON-LINEAR SERVOSYSTEM ADAPTED FOR
ATMOSPHERIC ALTITUDE MEASUREMENT

Filed Jan. 25, 1957

INVENTOR
GEORGE SENSENEY
BY
James and Franklin
ATTORNEYS.

March 1, 1960 G. SENSENEY 2,927,257
NON-LINEAR SERVOSYSTEM ADAPTED FOR
ATMOSPHERIC ALTITUDE MEASUREMENT
Filed Jan. 25, 1957 3 Sheets-Sheet 2
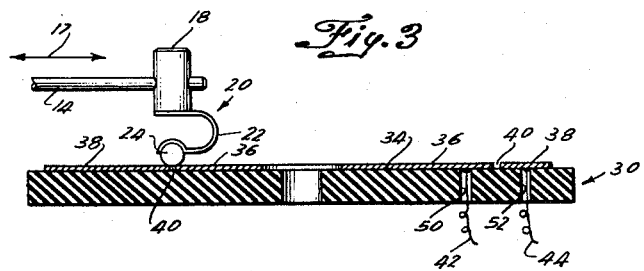
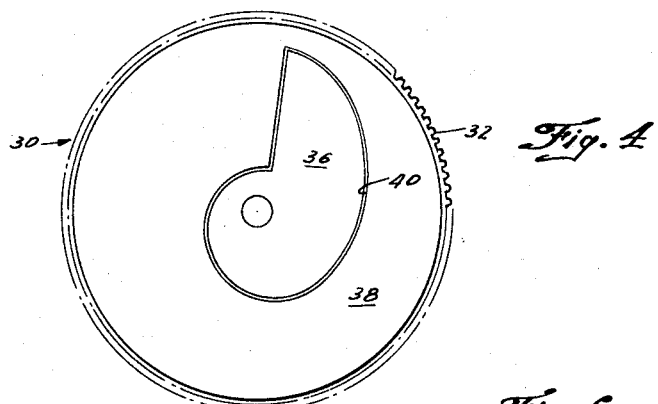
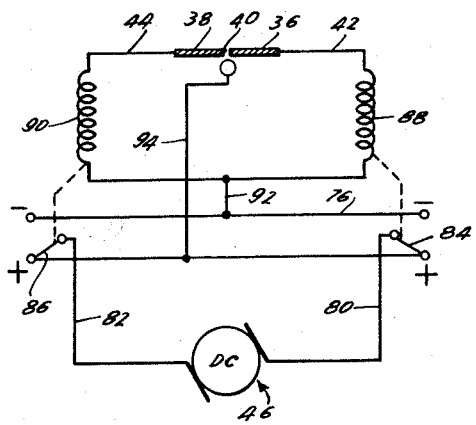
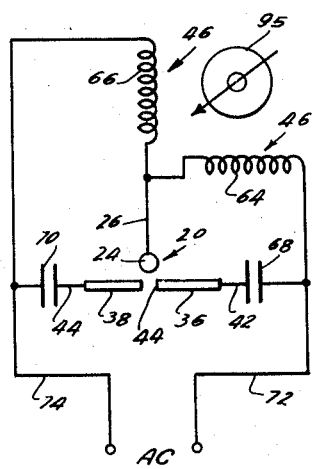
INVENTOR.
GEORGE SENSENEY
BY
*James and Franklin*
ATTORNEYS

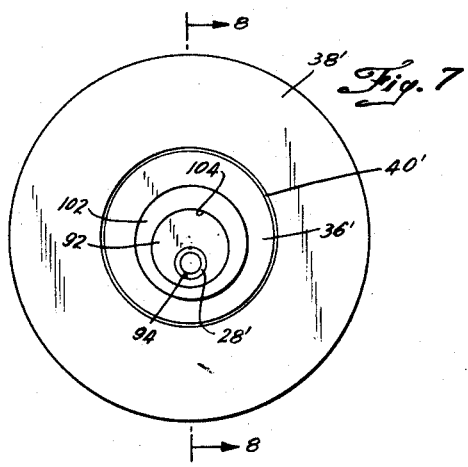
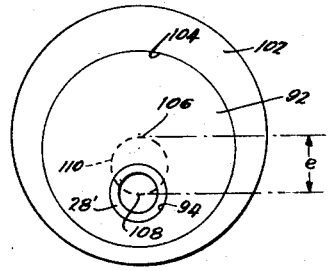
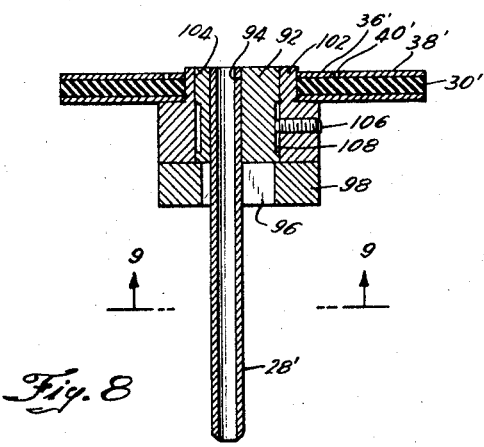
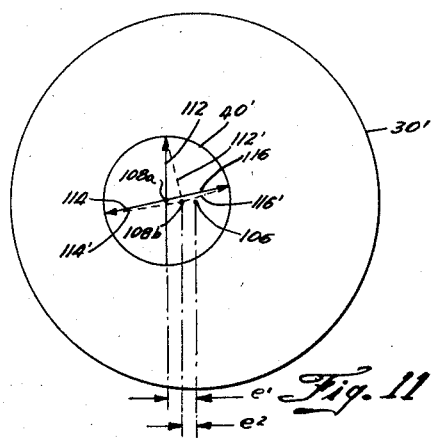
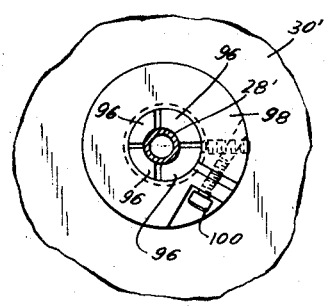
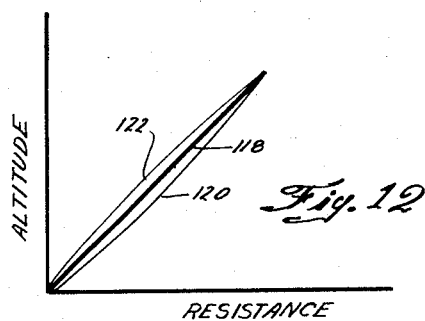

United States Patent Office 2,927,257
Patented Mar. 1, 1960

2,927,257

NON-LINEAR SERVOSYSTEM ADAPTED FOR ATMOSPHERIC ALTITUDE MEASUREMENT

George Senseney, New York, N.Y., assignor, by mesne assignments, to American Machine and Metals, Inc., New York, N.Y., a corporation of New York Application January 25, 1957, Serial No. 636,440

14 Claims. (Cl. 318—31)

The present invention relates to a device for translating a measured quantity or other input into an output which is a predetermined function of that measured quantity, and to a novel form of electrical cam and associated mounting and control mechanism used therein. It is especially well adapted for use where a non-linear relationship between input and output is desired.

This is a continuation-in-part of my earlier application, Serial No. 579,905, filed April 23, 1956, now abandoned, having the same title and assigned to the same assignee as this application.

The invention also relates to novel mechanism for converting linear displacement to rotative or angular displacement, or vice versa, in an inexpensive and practical way, and for introducing a non-linear function into that conversion.

Considered from one aspect, the present invention provides an effective, accurate and inexpensive means for effecting a predetermined non-linear conversion between movement of an input member and movement of an output member, and for compensating the output for known departures of the input from a predetermined norm. In the past non-linear conversion of movement has usually been effected by utilizing a mechanical cam and cam follower. This inescapably introduced an appreciable amount of friction into the linkage, and the shaping of the cam to provide the desired non-linearity in conversion was a difficult and expensive matter, because it involved precise machining operations on a comparatively substantial structural element.

In accordance with the present invention non-linear conversion is provided through the use of what is termed an electrical cam. This electrical cam comprises a member carrying a pair of contact segments separated by an elongated gap, the configuration of the gap introducing the desired non-linear function into the operation of the overall system. The gap can be accurately produced in desired configuration in a manner much simpler than that required to form and shape a mechanical cam. For example, conventional printed circuit techniques may be employed, such as photo-etching, which provides for a very high degree of accuracy at a very low cost. The cam is employed in conjunction with a "cam follower" in the form of a contact element movable over the contact segments and across the gap. When the contact element is in registration with the gap the system is at rest. When the contact element moves out of registration with the gap so as to engage a single one of the contact segments, the control circuit is effective to drive the output member in such a direction as to restore registration between the contact element and the gap, thus bringing the system again to rest but with the output member in a new position. It will be apparent that the position of the output member will therefore be determined not only by the position of the input member but also by the particular configuration of the gap. Since the position of the output member is power controlled, the only frictional effect of any significance in the translating system is the friction between the contact element and the contact segments and gap, and this is quite minor and may be almost completely minimized through appropriate design.

In the form here specifically disclosed the cam is power driven in rotation and constitutes the output member and the "cam follower" or contact element constitutes the input member and is moved in a straight line by the measuring device, but these relationships could, of course, be selectively or collectively reversed. The specific disclosure here is of the latter type because it is thought to represent a more advanced or complex type of sytem. The mechanical linkages utilized to convert from straight line to angular displacement even when a linear conversion was desired have always been fairly complex and not particularly conducive to precision operation except when great care is taken in the manufacture of the various structural elements. The rack and gear, the bell crank, and the drum and cable are typical of the various mechanical solutions proposed for this problem. The use of the electrical cam of the present invention even for linear conversion offers advantages over the mechanical linkages previously employed for this purpose because of the ease with which accuracy may be achieved without having to carry out time consuming and expensive precision mechanical operations in the manufacture of the parts thereof.

When non-linear conversion of straight line motion to angular motion is involved, conventional mechanical arrangements become exceptionally complex, since a mechanical cam and cam follower must be used in addition to the other mechanical components, thus adding to the expense of the overall system and introducing additional frictional factors.

The existence of excessive friction is often of controlling significance. For example, the measurement of air pressure, as in an aircraft altitude indicator, is best accomplished by using an aneroid cell. The movement of the aneroid cell is linear relative to changes in air pressure measured thereby, but altitude is not a linear function of pressure. Consequently, a typical mechanical linkage between the aneroid cell and an output shaft the position of which represents altitude comprises a rack and pinion, a cam, a cam follower, a bell crank, and a gear box. It will readily be appreciated that it is a difficut matter to make such a complicated linkage sufficiently precise to give accurate readings of altitude throughout the desired range. Moreover, an aneroid cell offers its highest accuracy of pressure measurement when its movement is not disturbed by any load. The friction involved in the mechanical linkages necessary to produce a visual indication or other signal of the measured altitude therefore represents, in mechanical systems, an almost insuperable obstacle to accuracy. However, with the electrical cam of the present invention the frictional load active on the aneroid cell is almost negligible, and hence the accuracy of the measuring system is greatly enhanced.

It often occurs that, in quantity production, each individual unit should be compensated for the peculiarities of the individual components which make it up. For example, aneroid cells may differ slightly one from the other in the relationship between their mechanical output and the pressure which they measure. It is not practical to produce a separate electrical cam for each aneroid cell. However, if the electrical cam is adjustably eccentrically mounted on the shaft which rotates it, the eccentricity of each cam relative to its shaft can be adjusted so as to compensate in whole or in part for the individual peculiarities of the aneroid cell or other measuring device with which it is associated. Moreover, the same eccentric adjustment can be utilized in many instances to compensate for known and substantially uniform characteristics of the measuring device. For example, the cam can be configured to produce a straight line function between input and output and the eccentric mounting of the cam on the shaft which rotates it can compensate for the non-linearity of the aneroid cell output with respect to measured pressure.

To the accomplishment of the above, and to such other objects as may hereinafter appear, the present invention relates to a system for translating the measurement of a property into a signal related thereto, and to an electrical cam and associated control mechanism useable in such a system, as defined in the appended claims and as described in this specification, taken together with the accompanying drawings, in which:

Fig. 3 is a cross sectional view on an enlarged scale of the electrical cam and contact element useable therewith;

Fig. 4 is a top plan view of a cam;

Fig. 5 is a schematic circuit diagram showing the manner in which the cam can control the direction of rotation of an A.C. motor;

Fig. 6 is a schematic circuit diagram showing the manner in which the cam can control the direction of rotation of a direct current motor;

Fig. 7 is a top plan view of another cam embodiment which is mounted on its driving shaft by means of an adjustable eccentric;

Fig. 8 is a cross sectional view taken along the line 8—8 of Fig. 7;

Fig. 9 is a cross sectional view taken along the line 9—9 of Fig. 7;

Fig. 10 is a diagrammatic view indicating the effect of rotation of one of the eccentric members relative to the other in shifting the position of the cam with respect to its driving shaft;

Fig. 11 is a diagrammatic view further illustrating the effect of adjustment of the eccentric mounting of the cam on its shaft; and Fig. 12 is a graphical representation of one manner in which adjustment of the eccentricity of the cam with respect to its driving shaft can compensate for non-linear characteristics of the measuring device.

Figure 1:
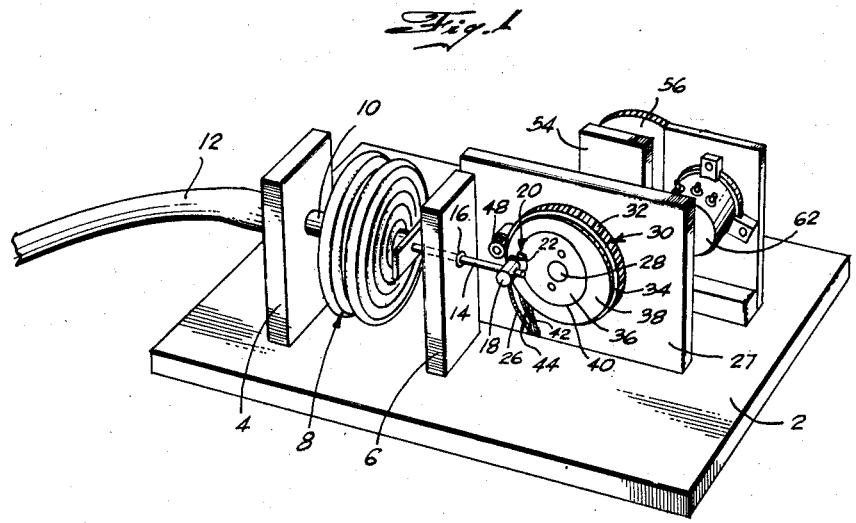
Fig. 1 is a three-quarter perspective view of a system for converting pressure measurement into an electrical or visual signal.
Figure 2:
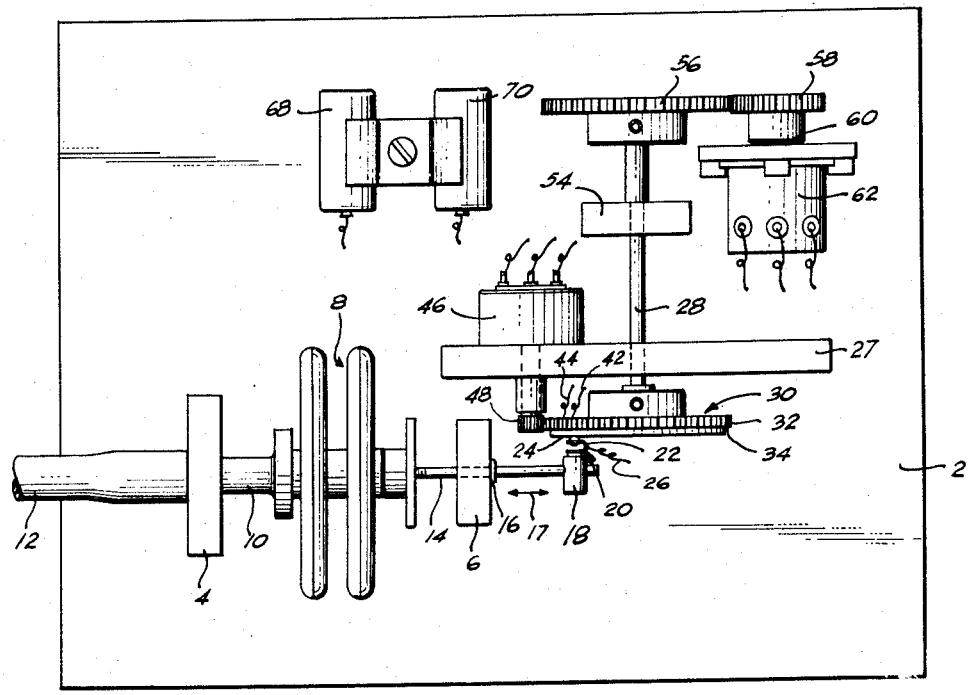
Fig. 2 is a top plan view of the apparatus of Fig. 1.

The apparatus here disclosed in Figs. 1–6 represents an uncompensated embodiment comprising a baseboard 2 having a pair of uprights 4 and 6 thereon between which a pressure sensitive element 8 in the form of an elastic aneroid capsule is mounted. The inlet end 10 of that capsule passes through the upright 4 and is connected to a tube 12 by means of which the pressure to be measured is brought to the capsule 8. Secured to the other end of the capsule 8 is a rod 14 which passes through an anti-friction bearing 16 in the upright 6 and extends out therebeyond. Hence as the capsule 8 expands and contracts in accordance with the increases or decreases in the pressure applied to the interior thereof, the rod 14 will correspondingly move to the right or to the left, as indicated by the arrow 17 in Figs. 2 and 3. A support 18 is mounted on the rod 14 and is preferably adjustably positionable thereon. It carries a contact element generally designated 20, here shown in the form of a reversely bent spring member 22 within which a ball 24 is rotatably mounted, the member 22 and ball 24 being electrically conductive and having a wire 26 electrically connected thereto in any appropriate manner.

The baseboard 2 carries another upright 27 positioned at right angles to the upright 6, and shaft 28 is journaled therein, the shaft 28 extending at right angles to the rod 14 and preferably being coplanar therewith, so that the straight line movement of the rod 14 is along a line which intersects the rotative axis of the shaft 28. Mounted on the shaft 28 for rotation therewith is a rotated member here shown as a disk 30 having gear teeth 32 around the edge thereof. The face 34 of the disk 30 is provided with a pair of conductive contact segments 36 and 38, the contact segment 36 being positioned radially inwardly of the contact segment 38 and the two contact segments being electrically separated by means of an elongated gap 40. The gap 40 may merely be a spacing between the segments 36 and 38, or that spacing may be filled with a suitable insulating material as desired.

It is the configuration of the gap 40 which determines the relationship between the input and the output of the system. The gap 40 in the embodiment of Fig. 1 is circular in configuration but is off-center with respect to the shaft 28. This represents but one of an infinite number of configurations which might be employed. Fig. 4 illustrates another typical configuration. While both of these illustrated configurations are regular in nature, that is not essential to the functioning of the system of the present invention, and the configuration could be whatever is appropriate to produce the desired relationship between input and output.

The contact segments 36 and 38 may be formed and secured to the disk 30 in any appropriate manner. Particularly effective is the formation of the contact segments 36 and 38 and the gap 40 by printed circuit techniques. The face 34 of the disk 30 could initially be provided with a continuous conductive coating such as a copper sheet or foil of minimal thickness. (The thickness in the drawings is exaggerated.) Thereafter a polar plot of the desired function to be introduced between input and output, linear or non-linear as desired, may be drawn on a graph, on an extremely large scale if desired, and the gap 40 may be formed as an exact replica of that plot by the well known photoengraving process, the plot being projected onto a photosensitive resist which coats the exposed surface of the copper sheet or foil, the gap 40 thereafter being formed by etching through the copper sheet or foil. Of course, the gap 40 could be formed by many other methods, such as by other printed circuit techniques or even by direct cutting through the copper sheet or layer. The gap 40 is preferably of very small width, perhaps between two and five thousandths of an inch.

The upright 26 also carries a reversible motor 46 the output shaft of which drives a pinion 48 which meshes with the gear teeth 32 on the disk 30. The contact segments 36 and 38 are electrically connected to individual leads 42 and 44 in any appropriate manner. As here disclosed (see Fig. 3) this electrical connection is achieved directly by passing the ends of the wires 42 and 44 through apertures 50 and 52 respectively in the disk 30 and soldering them directly to the underside of the contact segments 36 and 38, but this is merely exemplary, and any other way of achieving electrical connection or permitting rotatability of the disk 30, such as the use of slip rings, could also be employed.

The shaft 28 is also journaled in upright 54 and has gear 56 mounted thereon for rotation therewith, that gear 56 meshing with gear 58 secured to the input shaft 60 of a potentiometer 62, that potentiometer 62 being but typical of a large number of devices capable of producing a signal which varies in response to variations in the rotative position of the input thereto. Resolvers and various types of synchronous devices could, for example, be employed in place of the potentiometer 62 where a variable electrical signal is desired. Where a visual signal is desired the shaft 28 can be caused to operate an indicator such as a needle movable over a dial.

The electrical connections between the contact segments 36 and 38 and the contact element 20 on the one hand and the reversible motor 46 on the other hand are such as to cause the motor 46 to come to rest when the contact element 20 is in registration with the gap 40. When the contact element 20 is out of registration with the gap 40 and therefore is in contact with one or the other of the segments 36, 38, the motor 46 is caused to rotate in such a direction as to drive the disk 30 until the gap 40 is again brought into registration with the contact element 20. For example, in the embodiment of Fig. 1, movement of the contact element 20 to the right so as to engage only the inner conductive segment 36 would cause the disk 30 to rotate in a clockwise direction so as to bring into registration with the contact element 20 a portion of the gap 40 which is closer to the shaft 28.

Various types of motors 46 could be employed for this purpose, and the control circuits involved would be appropriate to the particular type of motor 46 employed. Purely by way of example, Figs. 5 and 6 show control schemes for an A.C. and a D.C. motor respectively.

In Fig. 5 the A.C. motor is of the two-phase type, having an armature 67 and field windings 64 and 66 respectively 90° out of phase. The contact segments 36 and 38 are connected, via capacitors 68 and 70 respectively, to opposite ends of the motor windings 64 and 66 respectively, while the contact element 20 is connected to a point between the motor windings 64 and 66. Leads 72 and 74 bring alternating current to the system as shown. When the contact element 20 is in registration with the gap 40 it will engage both of the contact segments 36 and 38, the current in the motor windings 64 and 66 will be balanced, and the motor will remain at rest. When the contact element 20 engages only the contact segment 36, only the capacitor 68 will be in the circuit, and the motor will operate in one direction. When the contact element 26 engages only the contact segment 38, only the capacitor 70 will be in the circuit and the motor will operate in the opposite direction.

In the system of Fig. 6 leads 76 and 76 are of opposite polarity and are connected to a suitable D.C. source. The D.C. motor is connected by means of leads 80 and 82 to switch elements 84 and 86 respectively, both of those switch elements normally being urged into engagement with one of the D.C. lines, here shown as the line 78. Relay coils 88 and 90 are active respectively upon the switch elements 84 and 86 so as, when energized, to cause their associated switch element to engage with the D.C. line 76. The contact segment 36 is connected to the relay coil 88 and the contact segment 38 is connected to the relay coil 90. The other ends of the relay coils 88 and 90 are connected by lead 92 to the D.C. line 76, and the contact element 20 is connected to the D.C. line 78 by lead 94. When the contact element 20 is in registration with the gap 40 it will engage both of the contact segments 36 and 38, both of the relay coils 88 and 90 will be energized, the opposite ends of the D.C. motor will both be connected to the line 76, and the motor will not operate. When the contact element 20 engages only the contact segment 36 only the relay coil 88 will be energized, and consequently the motor lines 80 and 82 will be connected respectively to the D.C. lines 76 and 78. The motor will therefore operate in a given direction. When the contact element 20 engages only the contact segment 38 only the relay coil 90 will be energized and consequently the motor lines 80 and 82 will be connected respectively to the D.C. lines 78 and 76. Hence the motor will operate in the opposite direction.

In the above explanations it has been assumed that the contact element 20, when in registration with the gap 40, will engage both of the contact segments 36 and 38. Such will indeed usually be the case when the gap 40 has an extremely narrow width, as is preferable for accuracy. However, if the gap 40 is of sufficient width, the contact element 20, when in registration therewith, will engage neither of the contact segments 36 and 38. In this event, however, the operation of the control systems will be essentially the same. In the A.C. embodiment of Fig. 5 the same current passing through the motor windings 64 or 66 in opposite sense will cancel one another out, while in the D.C. embodiment of Fig. 6 neither of the relay coils 88 and 90 will be energized, so that both of the motor leads 80 and 82 will be connected to the same D.C. line 78.

While the rotated member has here been shown in the form of a disk 30, it will be obvious that this is merely exemplary. That element could be linearly movable if desired, or it could be in the form of a cylindrical drum. Moreover, it will be apparent that although in the form here specifically disclosed the contact element 20 is physically moved in accordance with the input of the system and the disk 30 is power driven to define the output, this relationship could be reversed, the disk 30 or its equivalent being rotated or otherwise moved in accordance with the input to the system and the contact element 20 being power moved to define the system output.

It will be appreciated from the above that insofar as the pressure sensing device 8 is concerned, the only friction which it need overcome will derive from the movement of the rod 14 through the bearing 16 and the movement of the contact element 20 across the exposed face 34 of the disk 30. The friction involved in each of these movements is minimal, particularly where an effective anti-friction bearing 16 is provided and where, as is here specifically disclosed, the ball 24 is rotatable within the spring 22 so as to move freely across the contact segments 36, 38 and the gap 40. The extreme thinness of the gap 40 effectively minimizes any detent action when the contact element 20 is in registration with the gap 40, and any tendency toward such action could be completely eliminated by filling the gap 40 with a suitable insulating material. All of the friction in the remainder of the system is overcome by the force exerted by the motor 46. Consequently from the control point of view a substantially frictionless, and hence extremely accurate, apparatus is disclosed for converting a physical movement dependent upon the measurement of a specified property such as pressure into some other movement appropriately related thereto. In addition, the relationship of input to output need not be linear, but may correspond to any desired function either theoretically or empirically derived, and all without having to utilize components requiring extensive and expensive precision machining operations.

In the embodiment of Figs. 1–4, the cam disk 30 is fixed to and is concentric with its driving shaft 28. In the embodiment of Figs. 7–9, the cam disk 30' is adjustably eccentrically mounted on its driving shaft 28'. A circular hub 92 has an eccentrically positioned center aperture 94 within which the shaft 28' is received, a plurality of spaced shaft-encircling fingers 96 depending therefrom. A contractible collar 98 surrounds the fingers 96 and is provided with a screw 100 which, when tightened, causes the fingers 96 to firmly clasp the shaft 28' so that the hub 92 will rotate therewith. When, however, the screw 100 is loosened, the hub 92 can be rotated relative to the shaft 28'.

A second circular hub 102 is provided with an eccentrically located axial opening 104 within which the hub 92 is received, the depending portion of the hub 102 being provided with a set screw 106 adapted to engage the hub 92, preferably at areas 108 of reduced diameter. When the set screw 108 is tightened, the hubs 92 and 102 will rotate together, whereas when the set screw 106 is loosened, the hub 102 may be rotated relative to the hub 92. The cam disk 30' is fixed together with hub 102 in any appropriate manner. It carries on its upper surface contact segments 36' and 38' separated by a gap 40' similar to the gap 40 shown in Fig. 1.

It will be seen from the above structure that through relative positioning of the hubs 92 and 102 with respect to one another and with respect to the shaft 28' the eccentricity of the cam disk 30', and more particularly of the gap 40' thereon, relative to the axis of rotation of the shaft 28', may be adjusted. Obviously, any change in that eccentricity will result in a corresponding change in the relationship between the input and the output of the device. Adjustment may be made not only of the magnitude of eccentricity but also of the angularity of the relationship between the shaft 28' and a given point of reference on the cam gap 40'.

In Fig. 10, both of the eccentric hubs 92 and 102 are shown in their position of maximum eccentricity, so that the center of the cam disk 30' fixed to the hub 102 will fall at point 106 displaced from the axis 108 of the shaft 28' by the distance designated $e$. As shown, the eccentricity of the hubs 92 and 102 are of equal amounts. Hence, if the hub 92 be rotated within the hub 102, the center 106 of the hub 102 and the cam disk 30' will follow the dotted line 110, permitting an attainment of eccentricity $e$ at any value between zero and the maximum shown in Fig. 10. This adjustment may be made as indicated above by loosening the set screw 106. To rotatably adjust the cam disk 30' relative to the shaft 28', after the desired degree of eccentricity has been obtained, the set screw 106 is tightened, the screw 100 is loosened, the cam disk 30', together with the hubs 92 and 102 as a unit are rotated relative to the shaft 28' to their desired position, and the screw 100 is again tightened.

Fig. 11 indicates how adjustment of variation in the degree of eccentricity of the cam gap 40' relative to its axis of rotation will affect a non-linearity of the relationship between input and output. In Fig. 11, for purposes of clarity, the structure by means of which eccentricity is adjusted is not shown, that figure being merely diagrammatic. Point 106 represents, as before, the center of the hub 102 and consequently the center of the cam disk 30'. The point 108a represents the axis of the drive shaft 28' for a given degree of eccentricity $e_1$. For purposes of illustration, the point 108a is shown at the center of the circular cam gap 40', so that the radii 112, 114 and 116 from the axis 108a to the cam gap 40' are all of the same length. Under these circumstances, there will be no predetermined relationship between input and output, any given value of input having an infinite number of output positions of the cam disk 30' relative thereto.

If now the eccentricity is reduced to a value $e_2$, thus bringing the new axis of rotation 108b of the shaft 28' closer to the center 106 of the cam shaft 30', it will be seen that the radial lines 112', 114' and 116' will all be of a different length compared to the respective radii 112, 114 and 116 corresponding to the eccentricity $e_1$, and that the changes in the length of these radii would be different quantitatively and in direction. Thus, radius 114' is considerably longer than radius 114, radius 116' is considerably shorter than radius 116, and radius 112' is only slightly longer than radius 112. From this analysis, it will be appreciated that by altering the eccentricity $e$ from the value $e_1$ to the value $e_2$, a definite relationship between input and output has been achieved, that relationship will be non-linear, and the degree of eccentricity will not only affect the ratio of input to output for any particular position of the operative parts, but will also affect the degree of non-linearity of that relationship.

Fig. 12 graphically illustrates one way in which this adjustably eccentric mounting of the cam disk 30' on shaft 28' may be employed. The heavy line 118 represents a desired linear relationship of resistance output from the potentiometer 62 with respect to the altitude measurement by the aneroid capsule 8. The lower light line 120 represents the normal non-linear characteristic of standard aneroid capsule 8. By eccentrically positioning the cam disk 30' relative to the shaft 28' so as to give rise to the characteristic indicated by the upper light line 122 in Fig. 12, the desired linear input-output relationship 118 can be achieved. If the non-linear characteristics of a given aneroid capsule 8 should depart somewhat from the idealized characteristic represented by the line 120, the eccentricity of the cam disk 30' relative to the shaft 28' can be adjusted to compensate therefor in whole or in part, the adjustably eccentric mounting thus not only permitting compensation for a standard non-linearity, but also for the individual peculiarities of the particular sensing element or other system part associated therewith.

It will be understood that the above discussion has been exemplary only, and that the adjustably eccentric mounting of the cam disk 30' may be used for many other purposes. It will further be understood that the structure for the attainment of adjustably eccentric mounting may take a wide variety of forms.

While but a limited number of embodiments of the present invention have been here disclosed, it will be apparent that many variations may be made therein insofar as the broader aspects of the invention are concerned, all as defined in the following claims.

I claim:

1. A translating device for translating linear to rotative displacement comprising a support, a disk mounted thereon so as to be rotatable about an axis, means operatively connected to said disk for rotating it about said axis, radially inner and outer contact segments on an exposed face of said disk, said contact segments being electrically separated by an elongated gap, a contact element engaging said exposed face of said disk and mounted on said support so as to be movable linearly across said exposed face and from one side to the other of said gap, said gap being configured to define a predetermined function between (a) the rotated position of said disk relative to a reference position thereof and (b) the distance of said gap from said rotatable axis of said disk corresponding to said rotated position of said disk, and operative electrical connections between said disk moving means and said contact segments and contact element effective, upon the making of electrical contact between said contact element and only one of said contact segments, to cause said disk to rotate in a direction such as to restore said gap to a position beneath said contact element, whereby the rotative position of said disk will be determined by the position of said contact element relative to said predetermined position thereof and by the configuration of said gap.

2. The device of claim 1, in which the said disk is mounted on a shaft for rotation therewith via an adjustable eccentric mounting means, said shaft rotating about said axis, said means for rotating said disk being operatively connected to said shaft for rotating the latter, and said disk therewith, about said axis.

3. The of claim 2, in which said adjustable mounting means comprises a first eccentric secured to said shaft and rotatably adjustable relative thereto and a second eccentric received over said first eccentric and rotatably adjustable relative thereto, said disk being operatively connected to said second eccentric.

4. In the translating device of claim 1, a device for producing a variable signal in response to variations in the physical position of an associated element, and a linkage operatively connected between said output member and said associated element for positioning the latter in accordance with the rotative position of the former, whereby the signal produced by said device will vary in accordance with the rotated position of said output member.

5. A non-linear translating device for translating linear to rotative displacement comprising a support; a disk mounted thereon so as to be rotatable about an axis, radially inner and outer contact segments on an exposed face of said disk, said contact segments being electrically separated by an elongated gap, a contact element engaging said exposed face of said disk and mounted on said support so as to be movable across said exposed face and from one side to the other of said gap in a straight line which constitutes a radius from the rotatable axis of said disk, said gap being configured to define a predetermined non-linear function between (a) the rotated position of said disk relative to a reference position thereof and (b) the distance of said gap from said rotatable axis of said disk corresponding to said rotated position of said disk, and operative electrical connections between said disk moving means and said contact segments and contact element effective, upon the making of electrical contact between said contact element and only one of said contact segments, to move said disk to rotate in a direction such as to restore said gap to a position beneath said contact element, whereby the rotative position of said disk will be determined by the position of said contact element relative to said predetermined position thereof and by the configuration of said gap.

6. In the translating device of claim 5, a device for producing a variable signal in response to variations in the physical position of an associated element, and a linkage operatively connected between said output member and said associated element for positioning the latter in accordance with the rotative position of the former, whereby the signal produced by said device will vary in accordance with the rotated position of said output member.

7. A translating device comprising an output member and an input member, means operatively connected to said output member for moving it, a pair of contact segments on one of said members electrically separated by an elongated gap, a contact element selectively engaging said contact segment and gap and movable thereover, means operatively connected between said contact element and the other of said members for moving said contact element from one contact segment to the other across said gap as said other of said members moves, said gap being configured to define a predetermined function between (a) the poistion of said one of said members relative to a reference position thereof, and (b) the position of that portion of said gap intersecting the line of movement of said contact element relative to a reference position thereof, and operative electrical connections between said output member moving means and said contact segments and contact element effective, upon the making of electrical contact between said contact element and only one of said contact segments, to cause said output member to move in a direction such as to restore said contact element to a position in registration with said gap, whereby the position of said output member will be determined by the position of said input member and by the configuration of said gap.

8. In the translating device of claim 7, a device for producing a variable signal in response to variations in the physical position of an associated element, and a linkage operatively connected between said output member and said associated element for positioning the latter in accordance with the rotative position of the former, whereby the signal produced by said device will vary in accordance with the rotated position of said output member.

9. A translating device for translating between linear and rotative displacement comprising a support, a disk mounted thereon so as to be rotatable about an axis, means operatively connected to said disk for rotating it about said axis, radially inner and outer contact segments on an exposed face of said disk, said contact segments being electrically separated by an elongated gap, a contact element engaging said exposed face of said disk and mounted on said support so as to be movable linearly across said exposed face and from one side to the other of said gap, said gap being configured to define a predetermined function between (a) the rotated position of the said disk relative to a reference position thereof and (b) the distance of said gap from said rotatable axis of said disk corresponding to said rotated position of said disk, a member operatively connected to said contact element for moving the latter, and operative electrical connections between said contact segments and contact element on the one hand and one of said moving means for said disk and said contact element on the other hand effective, upon the making of electrical contact between said contact element and only one of said contact segments, to cause said one of said disk and contact element to move in a direction such as to restore said contact element to a position in registration with said gap, whereby the position of said one of said disk and contact element will be determined by the position of the other of said disk and contact element and by the configuration of said gap.

10. A translating device for producing a signal which is a predetermined function of pressure comprising a support, a pressure measuring device mounted on said support and having a member movable and positionable in accordance with the pressure measured by said device, a contact element operatively connected to said member so as to be moved thereby, a second member movably mounted on said support, means operatively connected to said second member for moving it, said second member having an exposed face carrying a pair of contact segments electrically separated by an elongated gap, said contact element engaging said exposed face of said second member and being movable across said exposed face and from one side to the other of said gap, said gap being configured to define a predetermined function between (a) the position of said second member relative to a reference position thereof and (b) the position of that portion of said gap intersecting the line of movement of said contact element relative to a reference position thereof, operative electrical connections between said moving means for said second member and said contact segments and contact element effective, upon the making of electrical contact between said contact element and only one of said contact segments, to cause said second member to move in a direction such as to restore said gap to a position beneath said contact element, a device for producing a variable signal in response to variations in the physical position of an associated element, and a linkage operatively connected between said second member and said associated element for positioning the latter in accordance with the position of the former, whereby the signal produced by said device will be determined by the pressure measured by said pressure measuring device and by the configuration of said gap.

11. A translating device for producing a signal which is a predetermined function of pressure comprising a support, a pressure measuring device mounted on said support and having a member movable and positionable in accordance with the pressure measured by said device, a contact element operatively connected to said member so as to be moved thereby, a rotatable member rotatably mounted on said support, means operatively connected to said rotatable member for rotating it, said rotatable member having an exposed face carrying a pair of contact segments electrically separated by an elongated gap, said contact element engaging said exposed face of said rotatable member and being movable across said exposed face and from one side to the other of said gap, said gap being configured to define a predetermined function between (a) the position of said rotated member relative to a reference position thereof and (b) the position of that portion of said gap intersecting the line of movement of said contact element relative to a reference position thereof, operative electrical connections between said moving means for said rotatable member and said contact segments and contact element effective, upon the making of electrical contact between said contact element and only one of said contact segments, to cause said rotatable member to rotate in a direction such as to restore said gap to a position beneath said contact element, a device for producing a variable signal in response to variations in the physical position of an associated element, and a linkage operatively connected between said rotatable member and said associated element for positioning the latter in accordance with the rotative position of the former, whereby the signal produced by said device will be determined by the pressure measured by said pressure measuring device and by the configuration of said gap.

12. The device of claim 11, in which said rotatable member is mounted on a shaft for rotation therewith via an adjustable eccentric mounting means, said shaft rotating about said axis, said means for rotating said rotatable member being operatively connected to said shaft for rotating the latter, and said rotating member therewith, about said axis.

13. The device of claim 12, in which said adjustable eccentric mounting means comprises a first eccentric secured to said shaft and rotatably adjustable relative thereto, and a second eccentric received over said first eccentric and rotatably adjustable relative thereto, said rotatable member being operatively connected to said second eccentric.

14. A translating device for producing a signal which is a predetermined function of pressure comprising a support, a pressure measuring device mounted on said support and having a member movable and positionable in accordance with the pressure measured by said device, a contact element operatively connected to said member so as to be moved thereby substantially in a straight line, a rotatable disk mounted on said support, means operatively connected to said rotatable disk for rotating it, said rotatable disk having an exposed face carrying a pair of contact segments electrically separated by an elongated gap, said contact element engaging said exposed face of said rotatable disk and being movable across said exposed face and from one side to the other of said gap, said gap being configured to define a predetermined function between (a) the position of said rotated disk relative to a reference position thereof and (b) the position of that portion of said gap intersecting the line of movement of said contact element relative to a reference position thereof, operative electrical connections between said moving means for said rotatable disk and said contact segments and contact element effective, upon the making of electrical contact between said contact element and only one of said contact segments, to cause said rotatable disk to rotate in a direction such as to restore said gap to a position beneath said contact element, a device for producing a variable signal in response to variations in the physical position of an associated element, and a linkage operatively connected between said rotatable disk and said associated element for positioning the latter in accordance with the rotative position of the former, whereby the signal produced by said device will be determined by the pressure measured by said pressure measuring device and by the configuration of said gap.

References Cited in the file of this patent

UNITED STATES PATENTS

| | | |
|---|---|---|
| 2,526,669 | Kellog et al. | Oct. 24, 1950 |
| 2,546,657 | Smoot | Mar. 27, 1951 |
| 2,588,386 | Hubbard et al. | Mar. 11, 1952 |
| 2,598,937 | Parker | June 3, 1952 |
| 2,611,115 | Johnston | Sept. 16, 1952 |